United States Patent
Ott

[11] Patent Number: 5,931,051
[45] Date of Patent: *Aug. 3, 1999

[54] VIBRATION DAMPENER FOR A ROTATING SHAFT

[76] Inventor: Vern D. Ott, 1839 Rte. 746 South, Cardington, Ohio 43315

[*] Notice: This patent issued on a continued prosecution application filed under 37 CFR 1.53(d), and is subject to the twenty year patent term provisions of 35 U.S.C. 154(a)(2).

[21] Appl. No.: 08/602,301

[22] Filed: Feb. 16, 1996

[51] Int. Cl.⁶ ............................................. F16F 15/10
[52] U.S. Cl. ............................................. 74/574; 74/603
[58] Field of Search ........................ 74/573 R, 574, 74/604, 603, 595, 606 R

[56] References Cited

U.S. PATENT DOCUMENTS

| | | | |
|---|---|---|---|
| 3,348,796 | 10/1967 | Baratoff et al. | 74/574 X |
| 4,161,237 | 7/1979 | Uchida et al. | 74/574 X |
| 4,571,215 | 2/1986 | Hansen | 464/180 |
| 4,584,901 | 4/1986 | Conseur | 74/574 |
| 4,734,079 | 3/1988 | Viets | 464/17 |
| 4,825,718 | 5/1989 | Seifert et al. | 74/574 |
| 4,848,183 | 7/1989 | Ferguson | 74/574 |
| 4,850,244 | 7/1989 | Eckel et al. | 74/574 |
| 4,852,424 | 8/1989 | Grassmuck et al. | 74/574 |
| 4,873,887 | 10/1989 | Andra et al. | 74/573 F |
| 4,895,047 | 1/1990 | George | 74/574 |
| 4,962,677 | 10/1990 | Withers | 74/574 |
| 5,295,411 | 3/1994 | Speckhart | 74/574 |
| 5,308,282 | 5/1994 | Hansen et al. | 464/68 |
| 5,308,289 | 5/1994 | Funahashi | 474/94 |
| 5,328,408 | 7/1994 | Wolf et al. | 464/180 |
| 5,341,780 | 8/1994 | Rau et al. | 123/192.1 |
| 5,425,287 | 6/1995 | Beattie | 74/574 |
| 5,441,456 | 8/1995 | Watanabe et al. | 74/574 X |
| 5,533,422 | 7/1996 | Speckhart | 74/574 X |
| 5,560,267 | 10/1996 | Todd et al. | 74/574 X |

*Primary Examiner*—Charles A. Marmor
*Assistant Examiner*—Saul J. Rodriguez
*Attorney, Agent, or Firm*—Kremblas, Foster, Millard & Pollick

[57] ABSTRACT

A drive shaft vibration dampener having an outer cylindrical housing which attaches to the end of the drive shaft. An inertia disc mounts within the housing, mounting to the housing through a spherical bearing which permits rotational and radial displacement of the inertia disc relative to the housing. A cover plate encloses the internal chamber housing the inertia disc, and the internal chamber is filled with elastomeric urethane. As the drive shaft deflects radially, the inertia disc lags behind, compressing the urethane and exerting a counteracting radial force on the housing, and the rigidly attached drive shaft.

10 Claims, 7 Drawing Sheets

VIBRATION DAMPENER FOR A ROTATING SHAFT

TECHNICAL FIELD

The invention relates generally to a vibration dampener, and more specifically relates to a vibration dampener for attachment to the end of a rotating shaft.

BACKGROUND ART

The crankshaft of a HARLEY DAVIDSON brand motorcycle is made of multiple pieces fastened together. This assembly, although apparently rigid, has flexibility which permits the free end of the drive shaft to be displaced radially. This radial displacement causes vibration in the radial direction, in addition to rotational, torsional vibration, which are transmitted to the other engine parts and the operator, loosening engine parts and making operation uncomfortable for the operator.

Various vibration dampeners have been made for reducing vibration on the end of a drive shaft. However, these dampeners are concerned with torsional vibration, rather than radial vibration. Torsional vibration arises from the asymmetrical firing pattern of the two-cylinder HARLEY DAVIDSON brand engine. As the drive shaft rotates, it appears to rotate at a relatively constant speed. However, during the firing sequence, there are brief increases and decreases in speed. Existing dampeners decrease torsional vibration which occurs due to these regular increases and decreases in rotational speed.

As described above, the multiple piece crankshaft is susceptible to flexure as the piston in the chamber which is firing causes the crankshaft to bend occasionally. This occasional bending, when occurring rapidly to a crankshaft rotating at several hundred or thousand revolutions per minute, causes the free end of the drive shaft to vibrate radially. The inventor knows of no vibration dampeners which significantly reduce this radial vibration.

BRIEF DISCLOSURE OF INVENTION

The invention is a dampener for mounting near the end of a rotatable shaft. The dampener comprises a massive disc, surrounded by an elastomer. The disc is mounted to the shaft by a bearing which permits motion of the disc in rotation about the shaft axis and about axes transverse to the shaft axis.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose.

DETAILED DESCRIPTION

Figure 1:
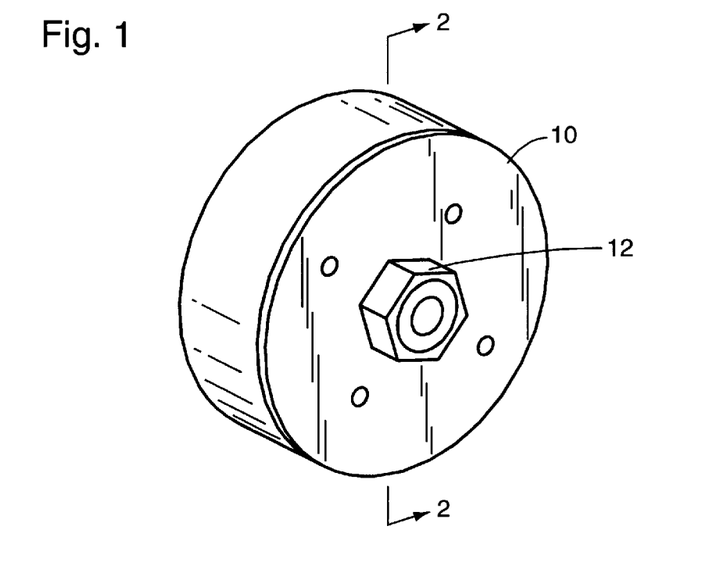
FIG. 1 is a view in perspective illustrating the preferred embodiment of the present invention.

The vibration dampener 10 shown in FIG. 1 attaches to the end of a rotatable drive shaft. The dampener 10 has a nut 12 mounted at one axial end for tightening the dampener 10 onto the threaded end of the shaft.

Figure 2:
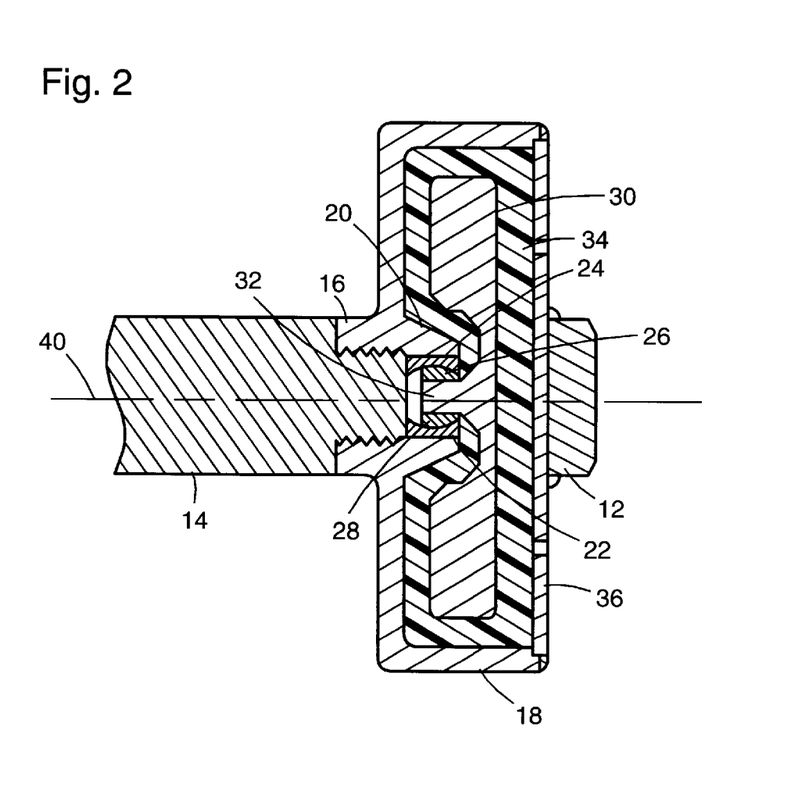
FIG. 2 is a side view in section through the line 2—2 of FIG. 1.

Referring to the view in section shown in FIG. 2, the drive shaft 14 threads into an external collar 16 integral with the dampener housing 18 which is locked to the shaft 14 with an adhesive. An integral internal collar 20 extends longitudinally away from the drive shaft 14 and has a cylindrical passage 22 forming a radially inwardly facing surface 24.

A ring 26 is mounted into the cylindrical passage 22, frictionally engaging the surface 24. A semi-spherical bearing 28 is slidingly mounted within the ring 26. The semi-spherical bearing 28 can rotate freely within the ring 26, and due to its spherically shaped outer surface, can rotate freely about its own center point. This bearing 28 can pivot about any axis intersecting the centerpoint of the sphere of which the spherical bearing 28 is a part.

The inertia disc 30 is within the housing 18, with its central shaft 32 mounted in the spherical bearing 28. The central shaft 32 frictionally engages the interior surface of the spherical bearing 28, permitting no slippage between the two engaging surfaces. Relative displacement can only occur at the contacting surfaces of the spherical bearing 28 and the ring 26.

The housing 18 has a resilient, elastomeric material, preferably a urethane 34, filling the gap between the inertia disc 30 and the housing 18. A cover plate 36 operates as a closure to the housing 18, retaining the urethane 34 within the housing 18. Prior to surrounding the inertia disc 30 with urethane 34, the inertia disc 30 is coated with TEFLON (polytetrafluoroethylene) to permit rotation of the inertia disc 30 relative to the urethane 34 which adheres to the housing 18 and would otherwise restrain the rotation of the inertia disc 30 about the axis 40.

The drive shaft 14 is driven rotationally about its axis 40 which corresponds with the axes of the ring 26, the inertia disc 30, the nut 12, the housing 18, the cover plate 36 and the centerpoint of the spherical bearing 28. While the drive shaft 14 is rotating about its axis 40, brief intervals of rapid increase and decrease in rotational speed occur as described above. When these occur, the inertia disc 30, which is a massive body whose majority of mass is positioned radially distally from its axis 40, rotates at a velocity slightly different than the instantaneous velocity of the drive shaft 14. The inertia disc 30 tends to maintain its speed due to inertia, while the speed of the shaft 14 varies. This tendency to maintain a speed different from the shaft 14 speed causes the inertia disc 30 to resist the varying speed of the shaft 14, and the rigidly connected housing 18 and urethane 34. Thus, the inertia disc 30 tends to resist the rapid increases and decreases in drive shaft 14 speed.

The drive shaft 14, in addition to vibrating torsionally, also vibrates radially, due to the axis of the housing 18 being displaced radially from the original axis 40 as discussed above. The inertia disc 30, however, tends to maintain its original radial position in addition to its original rotational position. The result of the inertia disc 30 maintaining its radial position at the instant the shaft 14 is displaced radially is illustrated as a "snapshot" in FIG. 3. When the shaft 14 is deflected radially in the direction shown by the arrow 50, the inertia disc 30 tends to stay in the original position in space it occupied prior to the deflection. This occurs due to inertia which, as is well known, tends to keep a massive body in place when a force acts on the body.

Once deflection of the shaft 14, and therefore the rigidly attached housing 18 and urethane 34, occurs, in order for the inertia disc 30 to retain its prior position, some of the urethane 34 is compressed and the inertia disc 30 must pivot the spherical bearing 28 within the ring 26. Because the inertia disc 30 compresses the urethane 34, a force is exerted leftwardly on the upper part of the housing 18 as shown by the arrow 51 and rightwardly on the lower part of the cover plate 36 as shown by the arrow 52 in the instance shown in FIG. 3. The net effect of these forces is to urge the shaft 14 in the opposite direction of its deflection.

Figure 3:
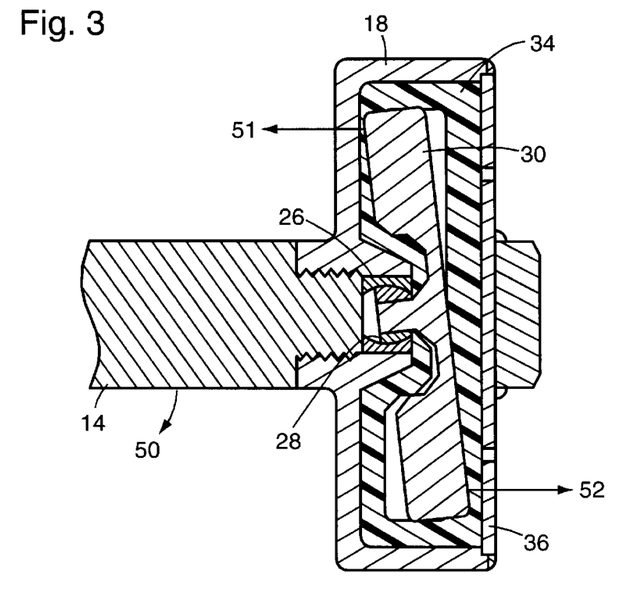
FIG. 3 is a side view in section illustrating the preferred embodiment similar to FIG. 2 but under altered conditions.

Of course, if the shaft 14 is deflected as described above and maintains this position for a significant time period, the inertia disc 30 will eventually be forced by the compressed urethane 34 to assume a new position. Inertia will be overcome in this case by the force which moves the end of the shaft 14 initially. However, this does not occur since this time period is never met and the inertia disc 30 forces the shaft 14 in the direction opposite its deflection the entire time the urethane 34 is compressed, with the force increasing as the displacement increases. Therefore, instead of the drive shaft 14 forcing the inertia disc 30 to a new position, the inertia disc 30 resists the deflection of the shaft 14 during the whole deflection, thereby reducing the maximum deflection.

Figure 4:
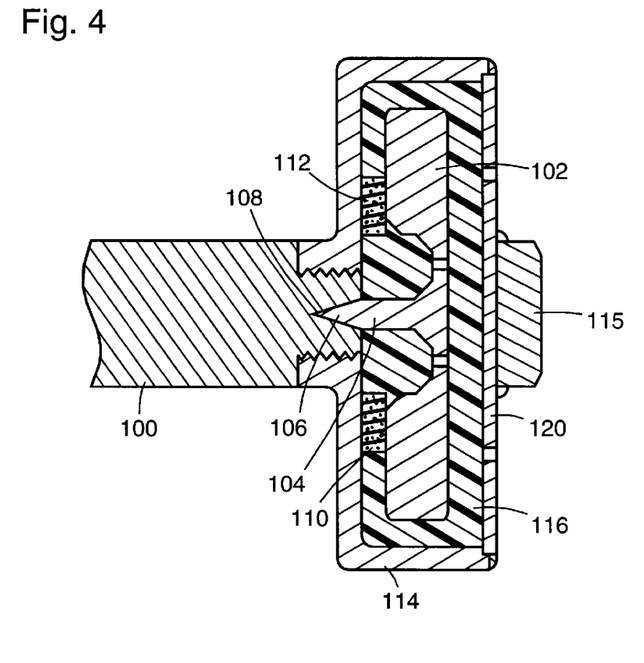
FIG. 4 is a side view in section similar to FIG. 2 illustrating an alternative embodiment.
Figure 5:
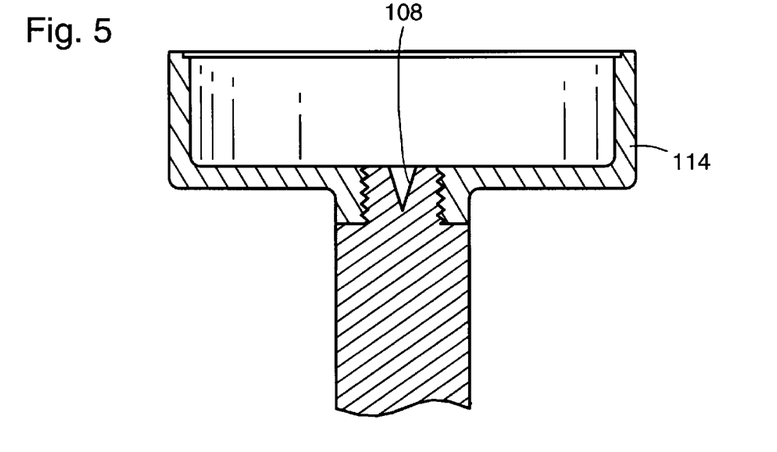
FIG. 5 is a side view in section illustrating the housing of the FIG. 4 alternative embodiment threaded on the shaft.
Figure 6:
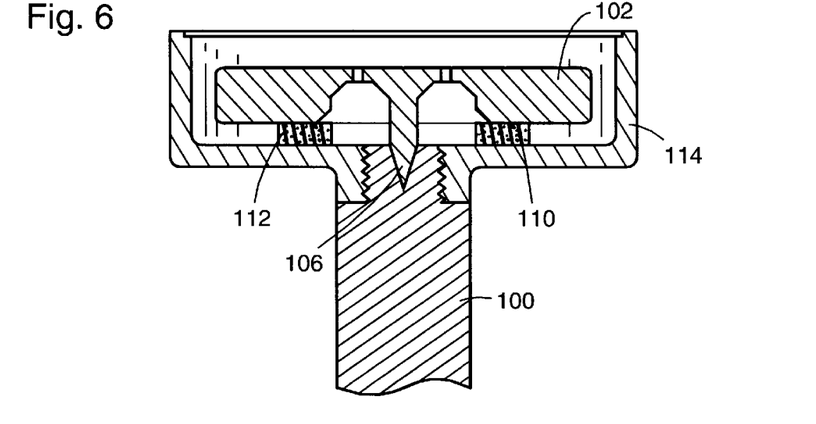
FIG. 6 is a side view in section illustrating the structure of FIG. 5 with elastomeric blocks and the inertia disc in operative position.
Figure 7:
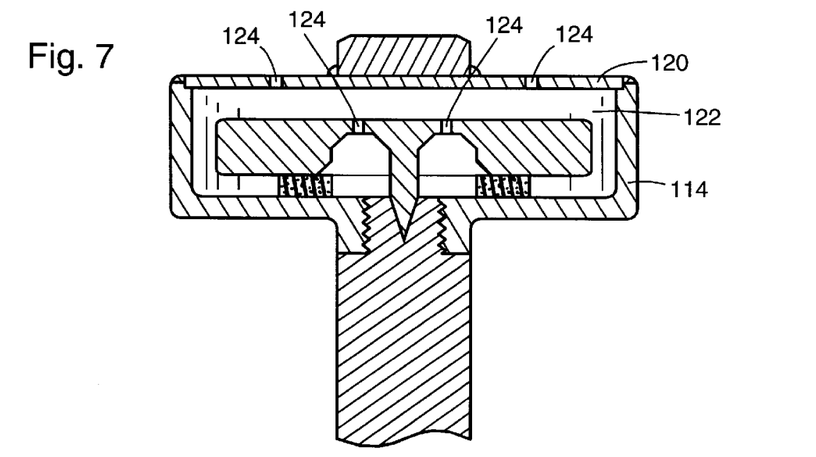
FIG. 7 is a side view in section illustrating the structure of FIG. 6 with the cover plate and integral nut in operative position.

An alternative to the preferred connection is the connection between a shaft 100 and the inertia disc 102 shown in FIG. 4. The inertia disc 102 has a central shaft 104 terminating in a conical tip 106. The shaft 100 has a similarly shaped conical indentation 108 into which the conical tip 106 is inserted. FIGS. 5, 6 and 7 illustrate the construction process of this embodiment in which the housing 114 is shown as empty in FIG. 5. Elastomeric blocks 110 and 112 are placed onto the lower surface of the housing 114 and the inertia disc 102 is positioned with its conical tip 106 extending into the indentation 108 of the shaft 100. The cover plate 120 is then fastened to the housing 114 as shown in FIG. 7 and urethane is injected into the cavity 122 which is shown containing urethane 116 in FIG. 4. Bleed holes 124 are provided for permitting injected urethane to penetrate into all cavities within the housing 114.

Referring again to FIG. 4, the urethane 116 can be pre-compressed by the shaft 100 by positioning the inertia disc 102 slightly further from the cover plate 120 with blocks that are thinner than the blocks 110 and 112. The cavity is then filled with urethane 116 and, when the urethane 116 is hardened, the shaft 100 is threaded into the housing 114. The conical tip 106 engages the indentation 108 prior to the shaft 100 seating against the housing 114. The nut 115 is then tightened further which causes a force to be directed axially against the inertia disc 102 by the shaft 100. This compresses the urethane 116 in the space between the inertia disc 102 and the cover plate 120. Pre-compressing the urethane 116 increases the hardness of it, and therefore affects the characteristics of the urethane 116. By tightening or loosening this compression, by inserting spacers between the housing 114 and the shaft 100, a given dampener can have various performance characteristics. These characteristics will be apparent to one of ordinary skill in view of this description.

The urethane used in the preferred embodiment has a Hardness in a broad range between 5 and 70 on the Shore D Scale and preferably a Hardness of about 22. The urethane also preferably has a Recovery Delay broad range of between 0.1 and 4 seconds and preferably between 1 and 2 seconds. The material is a low stoichiometry, polyether based urethane, utilizing biuret crosslinking. This crosslinking is disturbed during the cure cycle by a complex alcohol reaction on the double bonds, causing asymmetrical ring crosslinks of a special nature; that is, they exhibit spontaneous deformation. This structure detracts little from the desired mechanical hardness, but shows improved energy dissipation under dynamic mechanical deformation.

Because of the energy absorption characteristics of the urethane, it provides the preferred combination of resistance to deformation, which affects spring constant, k, and Recovery Delay which effects energy absorption. This combination results in a material which provides excellent dampening for the application on a HARLEY DAVIDSON brand motorcycle drive shaft. Of course, other applications are possible, but may require other ranges of hardness, etc. which will be apparent to one of ordinary skill in the art in view of this description.

Figure 8:
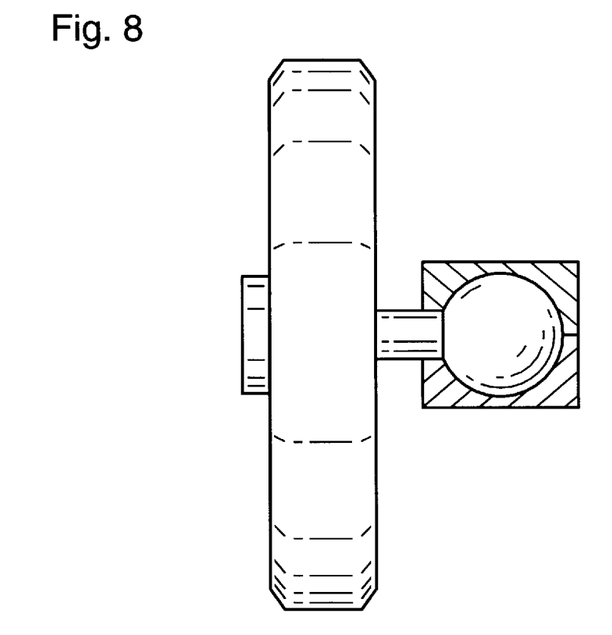
FIG. 8 is a side view in section illustrating second alternative embodiment.

FIG. 8 illustrates the dampener 10 spaced longitudinally from the spherical bearing 28.

Figure 9:
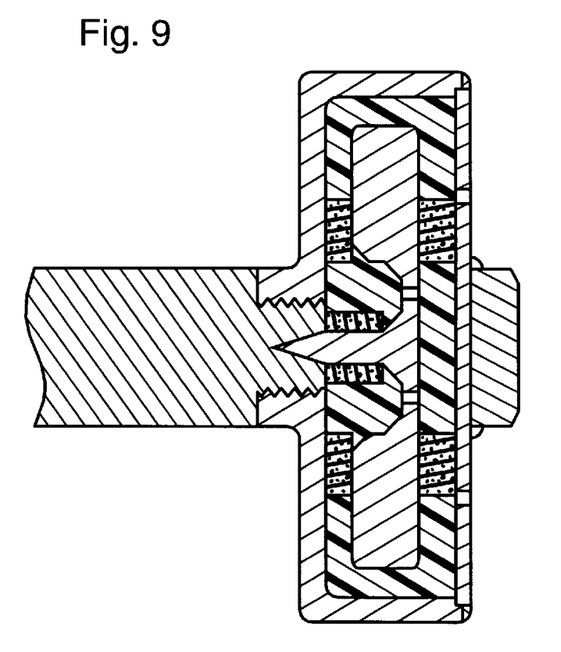
FIG. 9 is a side view in section illustrating an alternative embodiment.

FIG. 9 illustrates a third alternative embodiment similar to the first alternative embodiment of FIG. 4. Foam rubber pads are mounted in the housing at both faces of the disc and one surrounds the central shaft of the disc.

Figure 10:
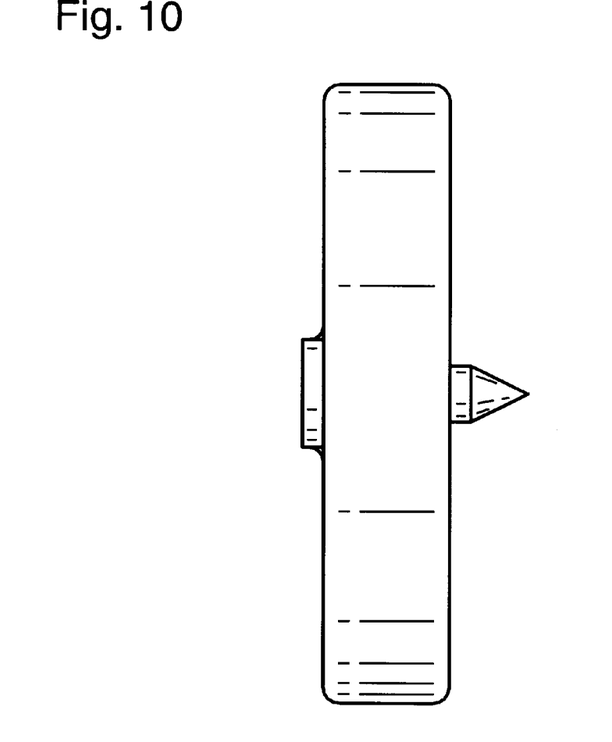
FIG. 10 is a side view illustrating an alternative inertia disc.

FIG. 10 illustrates a dampener housing where the threaded boss is recessed within the housing and the central shaft projects beyond the boss and housing.

Figure 11:
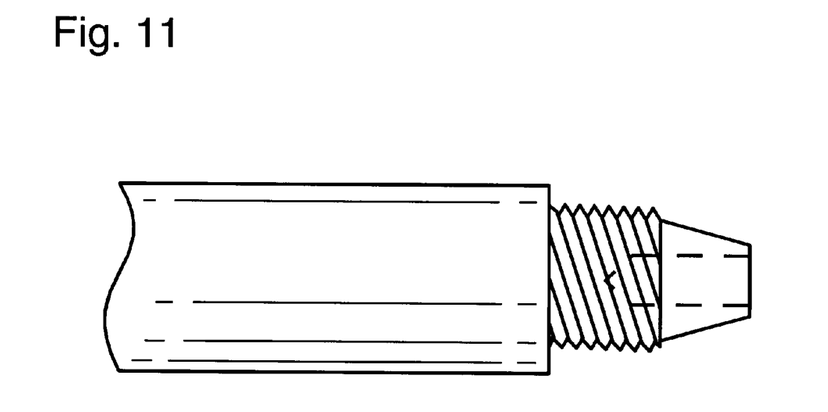
FIG. 11 is a side view illustrating a drive shaft.

FIG. 11 illustrates a shaft with a deeper indentation in its end to receive a longer central shaft from the dampener housing.

Figure 12:
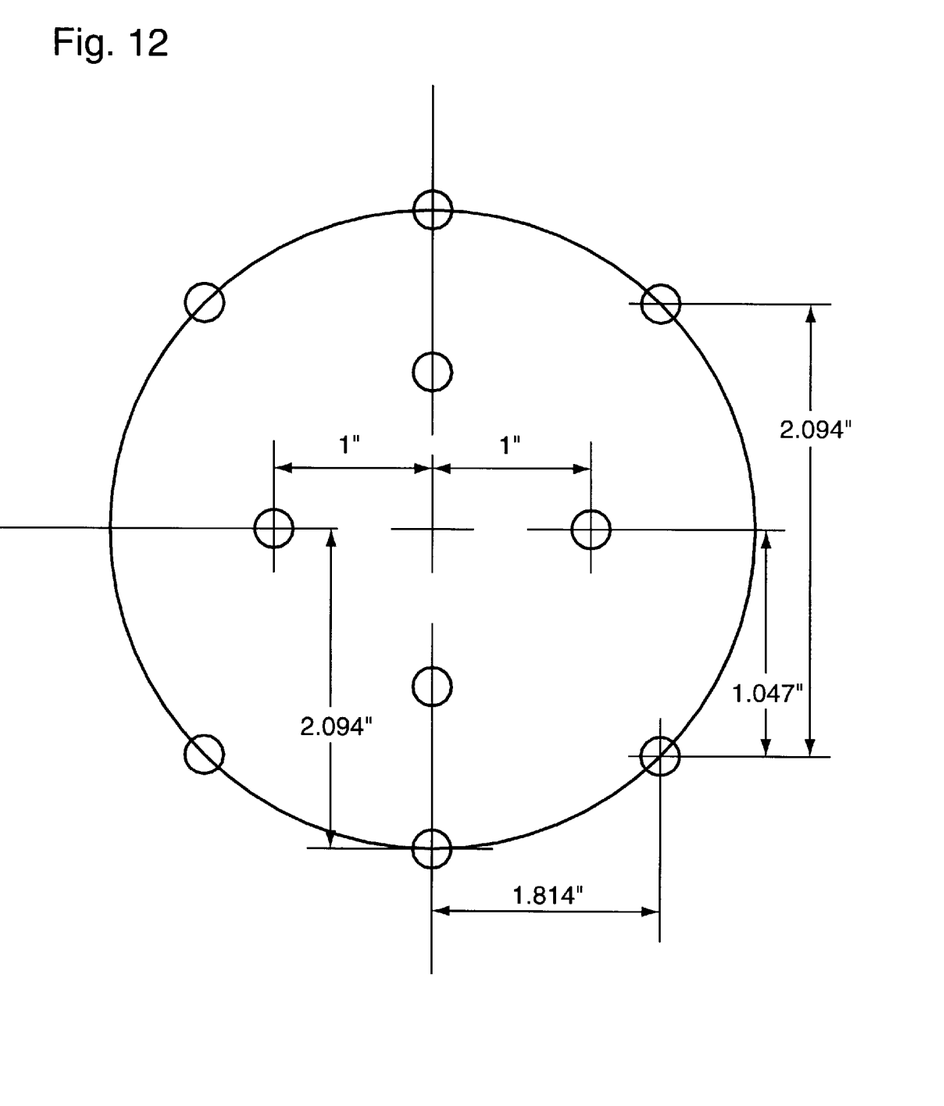
FIG. 12 is a side view illustrating a cover plate.

The cover plate of FIG. 12 bears dimensions preferred in the embodiments best suited for the dampener of this invention.

Figure 13:
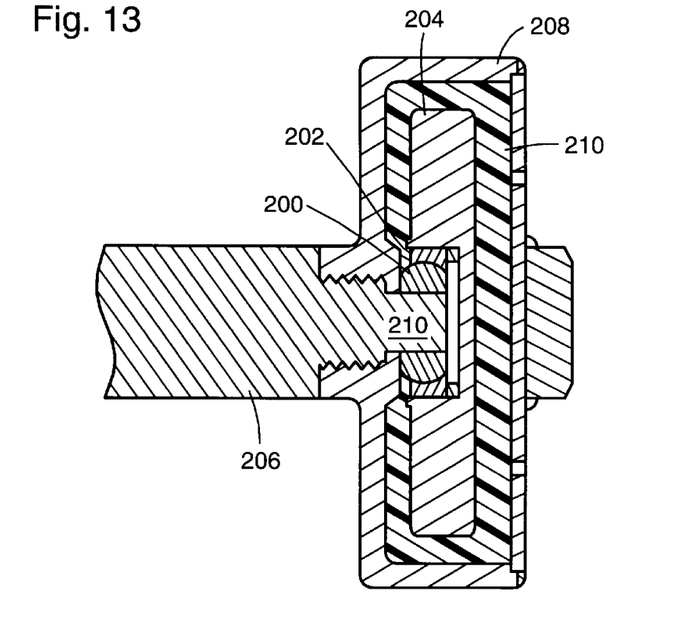
FIG. 13 is a sectional side view illustrating a fourth alternative embodiment of the present invention.
Figure 14:
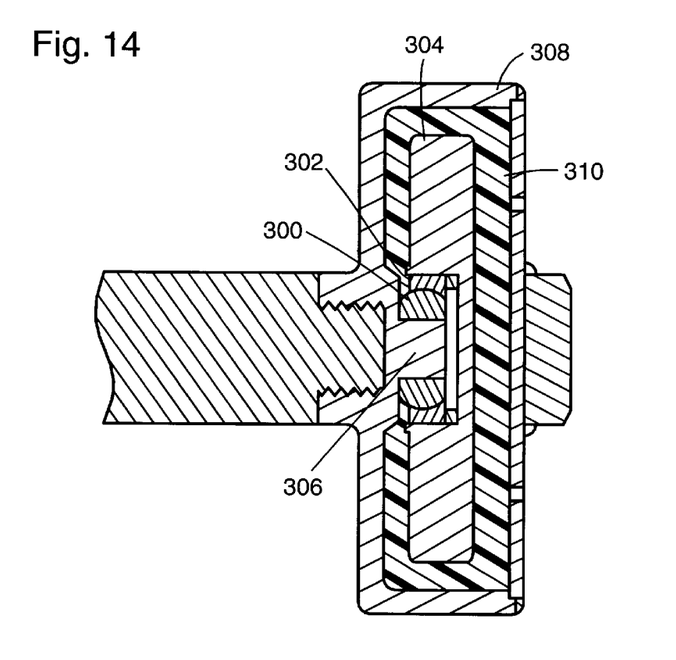
FIG. 14 is a sectional side view illustrating a fifth alternative embodiment of the present invention.

FIGS. 13 and 14 show functionally equivalent structures to the embodiment illustrated in FIG. 2, but with slight changes for manufacturing and assembly simplification. For example, FIGS. 13 and 14 have spherical bearings 200 and 300 rotatably mounted in rings 202 and 302, respectively. Rings 202 and 302 rigidly mount to inertia discs 204 and 304, respectively, and bearings 200 and 300 rigidly mount to drive shaft 206 and member 306 respectively. Inertia discs 204 and 304 freely move relative to the housings 208 and 308, respectively, as inertia disc 30 moves relative to housing 18 of FIG. 2. Elastomeric urethanes 210 and 310 fill the housings 208 and 308, respectively, and function similarly to urethane 34 of FIG. 2. The primary difference between the embodiments of FIGS. 13 and 14 and that of FIG. 2 is that the bearings 200 and 300 mount directly to the shaft 206 in FIG. 13 and the housing member 306 in FIG. 14, but the bearing 28 mounts to the inertia disc 30 in FIG. 2. The reason for the reversal is that the configuration of FIGS. 13 and 14 allows the same inertia disc, ring and bearing to be used whether or not the drive shaft to which the vibration dampener mounts has the unthreaded extension 212. If not, then the housing 308 of FIG. 14 is used, which has the member 306 which is inserted into the bearing 300.

While certain preferred embodiments of the present invention have been disclosed in detail, it is to be understood that various modifications may be adopted without departing from the spirit of the invention or scope of the following claims.

I claim:

1. A vibration dampener for a rotating shaft, comprising:
   (a) a housing adapted to be rigidly mounted to the shaft;
   (b) an inertia disc rotatably mounted within the housing and supported in the housing by an elastomeric material engaging the housing and the disc; and
   (c) a bearing linking the shaft to the disc and, permitting the inertia disc to pivot about an axis of rotation of the shaft and about axes transverse to the axis of the shaft.

2. The dampener of claim 1 wherein said disc bears a coating to allow relative movement between said disc and said elastomeric material.

3. The dampener of claim 2 wherein the bearing comprises a first bearing portion having a semi-spherically shaped outer surface and a second bearing portion having an inner surface engaging and mating with the semi-spherically shaped outer surface of the first bearing portion.

4. The dampener of claim 2 including a compressible ring between said disc and said housing to allow prestressing of said elastomeric material by tightening said housing on the end of the shaft.

5. The dampener of claim 2 wherein said bearing surface is conical to penetrate a matingly shaped bearing surface in the end of said shaft.

6. The dampener of claim 2 wherein said elastomeric material surrounds a portion of the disc to fill space in the housing not filled by the disc.

7. The dampener of claim 1 wherein the bearing comprises a first bearing portion having a semi-spherically shaped outer surface and a second bearing portion having an inner surface engaging and mating with the semi-spherically shaped outer surface of the first bearing portion.

8. The dampener of claim 1 including a compressible ring between said disc and said housing to allow prestressing of said elastomeric material by tightening said housing on the end of the shaft.

9. The dampener of claim 1 wherein said bearing surface is conical to penetrate a matingly shaped bearing surface in the end of said shaft.

10. The dampener of claim 1 wherein said elastomeric material surrounds a portion of the disc to fill space in the housing not filled by the disc.

* * * * *